Figure 1:
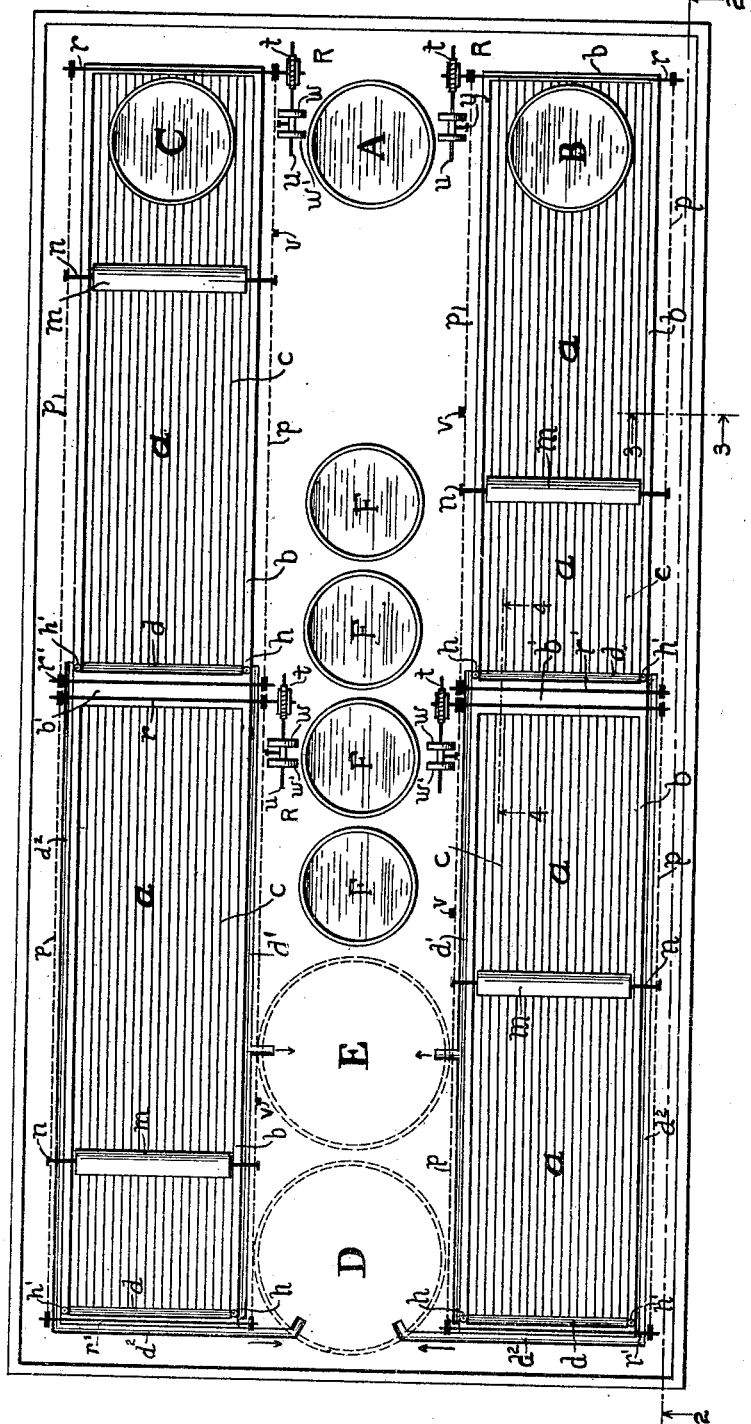

No. 706,303. Patented Aug. 5, 1902.
L. B. DARLING.
PROCESS OF EXTRACTING PRECIOUS METALS FROM ORES.
(Application filed Feb. 12, 1902.)
(No Model.) 2 Sheets—Sheet 1.

WITNESSES.
INVENTOR.
Levi B Darling.
By
Att'ys

No. 706,303. Patented Aug. 5, 1902.
L. B. DARLING.
PROCESS OF EXTRACTING PRECIOUS METALS FROM ORES.
(Application filed Feb. 12, 1902.)
(No Model.) 2 Sheets—Sheet 2.
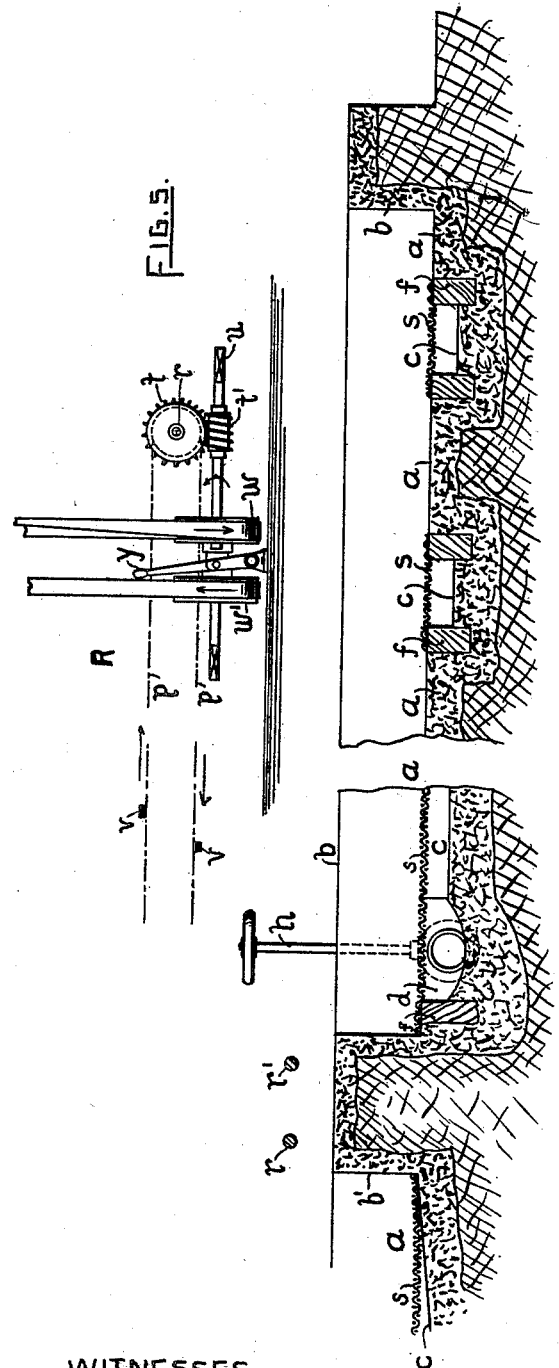
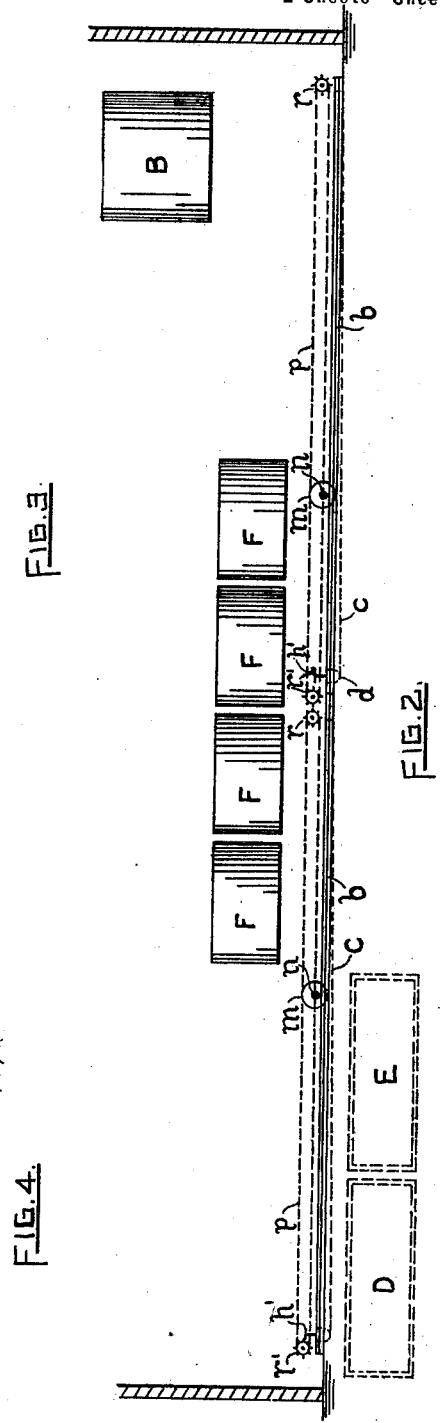
WITNESSES.
G. E. Smith
Chas. P. Day
INVENTOR.
Levi B Darling
By Geo. H. Remington & Co
Att'ys

UNITED STATES PATENT OFFICE.

LEVI B. DARLING, OF PROVIDENCE, RHODE ISLAND.

PROCESS OF EXTRACTING PRECIOUS METALS FROM ORES.

SPECIFICATION forming part of Letters Patent No. 706,303, dated August 5, 1902.

Application filed February 12, 1902. Serial No. 93,705. (No specimens.)

*To all whom it may concern:*

Be it known that I, LEVI B. DARLING, a citizen of the United States of America, and a resident of Providence, in the county of Providence and State of Rhode Island, have invented certain new and useful Improvements in Methods or Processes of Extracting Precious Metals from Ores, of which the following is a specification.

My invention relates to improvements in methods or processes for the extraction of gold and other precious metals from finely-divided ores; and it consists, essentially, in spreading a comparatively thin layer of slime-pulp containing the metal over a substantially flat surface provided with strainer-covered channels communicating with the sump, then covering the pulp's surface with a thin layer of the metal-dissolving or cyanid solution, then subjecting the mass of material to a rolling operation, thereby thoroughly stirring or agitating it and causing the oxygen of the atmospheric air to mingle therewith, the rolling operation at the same time forcing the metal-carrying solution through the strainers and into the channels, and finally discharging said metal-carrying solution therefrom into the sump and precipitating the precious metals from the solution, all as will be more fully hereinafter set forth and claimed.

In the pending application for patent filed by me in the United States Patent Office, Serial No. 80,768, I have shown, described, and claimed improved means or apparatus for the extraction of the precious metals from pulverized or finely-divided ores, said apparatus being well adapted to be employed in carrying out the improved method or process forming the subject of the present application for patent.

The object I have in view is to so treat the suitably-prepared ore that it will be more thoroughly and quickly acted upon by the solution, the ore at the same time being spread out in a comparatively thin layer and stirred or agitated, so as to expose it to the action of atmospheric air, the result being that a greater amount of oxygen is absorbed and the operation is accomplished in much less time and with less power than is usually required in treating material of this character.

I am of course aware that processes and means for agitating pulverized ores so as to combine oxygen therewith have been devised prior to my invention. Therefore I do not claim such broadly.

In the accompanying drawings, Figure 1 is a plan view of a gold-extracting plant or apparatus capable of being employed in carrying out my improved process. Fig. 2 is a longitudinal sectional view taken on line 2 2 of Fig. 1. Fig. 3 is a transverse sectional view, enlarged, taken on line 3 3 of Fig. 1, showing the channels and strainers or filters. Fig. 4 is a sectional view, enlarged, taken on line 4 4 of Fig. 1; and Fig. 5 is a partial side elevation, enlarged, showing portions of the mechanism for actuating the pulp-agitating roll.

In carrying out my improved process I may provide a series of substantially level floors *a a*, made, say, of cement. Each floor has a series of longitudinally-extending narrow grooves or channels *c c* formed therein, the sides of which may be faced with strips of wood *f*. The grooves are slightly inclined, each terminating at its lower end in a larger or transverse groove *d*, termed a "launder." (See Fig. 4.) A suitable filter or strainer *s* covers each of the channels, so arranged that the liquid solution may pass through the strainers, while excluding the ore or material. In the drawings, Fig. 1, I have represented a series of four rectangular-shaped floors *a*. These are bounded by circumscribing walls *b*, having a height, say, of ten inches, and are covered with cement or other suitable material, so as to prevent the absorption of the solution containing the dissolved precious metals. The said floor may be arranged so as to form two double floors each having a transverse dividing or bridge wall *b'*, as clearly shown. (See also Fig. 4.) Each of the lower floors (being the ones at the left) has a longitudinally-extending launder *d'* arranged just exterior of the inner side walls *b* and communicating with the sump-tank E, containing the strong solution. Parallel with the other or outer side wall is arranged another launder *d²*, the same extending to and across the lower end of the floor, but exterior of it, and communicates with the sump-tank D, containing the weak solution. A valved connection $h$ is interposed between the ends of the launders $d'$ and the adjacent ends of the corresponding cross-launders $d$. A similar connection $h'$ is located between the ends of the opposite launder $d^2$ and the other ends of the said cross-launders, as clearly shown in Fig. 1. The valved connections pass through the adjacent walls $b$ and form water-tight joints therewith. The bottom of each launder $d'$ is inclined, so as to direct the flow of the saturated solution toward the center, at which point it is in open communication with the sump-tank E, containing strong solution. The other launders $d^2$ are each inclined throughout its length and in open communication with the corresponding sump-tank D, containing weak solution.

In a plant embodying my improvement and adapted for the chemical extraction of the precious metals from slime-pulp the ground plan may be, say, one hundred and twenty-eight feet by sixty feet and having at one end thereof the elevated tanks A B C for water, strong solution, and weak solution, respectively, each tank being, say, fourteen feet diameter by ten feet deep. At the opposite end of the plant and located between the two series of double floors $a$ $a$ are placed two sunken sump-tanks D E for the weak and strong solutions, respectively, each tank being twenty feet diameter by six feet deep. There are also employed four slightly-elevated "salt-leach" tanks F, (one for each floor $a$,) each tank being, say, twelve feet diameter by six feet deep and adapted to contain some fifteen tons of pulverized ore. The said tanks F are charged with the pulverized ore and form reservoirs from which the ore is shoveled or discharged onto the treating-floors $a$.

I may state here that I prefer to arrange the several floors, tanks, &c., so as to form a duplex or double plant or system substantially as represented in Fig. 1 of the drawings, the arrangement being such that while the ore is being treated on the floors of one half of the plant the other half of the plant may be cleaned up, thus working the mechanism, &c., alternately. By means of my invention the charge of ore spread evenly over one double floor may be thoroughly agitated and treated during a continuous run, say, of twelve hours, the other double floor meanwhile having the solution drawn therefrom into the respective tanks, followed by removing the treated material or ore from the floor onto the waste-dump and recharging with fresh ore from the supply-tanks F, substantially as before stated.

In the drawings I have represented the rolling or ore-agitating mechanism R as consisting of a suitable roll $m$, extending transversely of the floor $a$, and means for slowly propelling the roll to and fro along the floor. The roll is secured to a shaft $n$, the latter being above and extending beyond the side walls $b$ and adapted to revolve in suitable bearings secured to the two endless side chains or driving connections $p$ $p$. These latter are mounted on suitable sprocket-wheels secured to the two end shafts $r$ $r'$, revolving in bearings located at the upper and lower ends, respectively, of each floor. An end of one shaft—say the upper one $r$—is extended and carries a worm-gear $t$, meshing into and actuated by a worm $t'$ of the short driving-shaft $u$. On the latter shaft are mounted two loose clutch-pulleys $w$ $w'$, adapted to be revolved in opposite directions by open and crossed driving-belts in a well-known manner. A sliding clutch member is mounted on and revolves the pulley-shaft—that is, when the shipper-arm $y$, connected with the clutch, is swung to the left the clutch engages the corresponding pulley $w'$, thereby causing the shaft to revolve in one direction. By moving the shipper to the right the clutch is withdrawn from pulley $w'$ and engages pulley $w$, thus adapting the shaft to be revolved in the opposite direction. It is obvious that the driving mechanism just described is adapted to propel the chains $p$ simultaneously and in unison in either direction, thereby correspondingly actuating the roller $m$ and agitating the pulp or material beneath it. The action of the roll serves not only to stir up or agitate the pulp, so that it becomes thoroughly aerated or exposed to the atmosphere, but it at the same time forces some of the metal-charged solvent or solution downwardly through the screens $s$ and into the channels or ducts $c$, communicating with the end launder $d$.

In order to automatically reverse the direction of the traveling chains $p$ when the roll arrives at the end of the floor or at any other predetermined point, as desired, the chain contiguous to the clutch mechanism may be provided with two dogs $v$ $v$, arranged or disposed with respect to the roll so that at or about the instant the latter arrives at the end of the floor or run the corresponding dog will engage the shipper-arm $y$ and swing it to the opposite extreme, thus clutching the shaft $u$ to the other driving-pulley, and since the latter pulley revolves in a reverse direction to that of its fellow pulley it follows that the chain's movement will be correspondingly changed, thus propelling the roll back again, the operation being continued as long as desired. By placing the shipper in the central or vertical position the clutch will be inactive or disengaged from both pulleys, the roll then being rendered inoperative.

The manner of extracting the precious metals from ores by means of my invention is substantially as follows: The auriferous chloridized ore in a finely-divided state is first delivered into the leach-tanks or salt-leach tanks F. After the ore is thoroughly leached it is discharged therefrom onto one of the empty double treating-floors $a$ $a$ and leveled off, the quantity of material forming a charge being sufficient to make a layer, say, three inches deep. This is followed by covering the surface of the said material with a strong solution drawn from tank B until the liquid attains a mean depth of about one inch. The solution contained in said tank B carries the proper amount of cyanid of potassium or other suitable chemical dissolving agent for the precious metals. After the solvent-supply to the floor has been cut off the said rolling mechanism R is set in motion, whereby the heavy rolls $m$ are drawn back and forth alternately and longitudinally of the floors, the action of the rolls being to thoroughly agitate the material thereunder, so that all the ore is brought into intimate contact with the solution and with the atmospheric air, while at the same time some of the solution is forced through the screens or strainers $s$ into the groove $c$ beneath. This rolling operation is continued uninterruptedly, say, for twelve hours, at the end of which time it will be found that practically all the precious metals previously contained in the ore in a free state have been dissolved out and combined with the solution then lying in the grooves $c$ and launders $d$. The two valved connections $h$ are next opened, thus permitting the charged or strong solution to flow freely from the said grooves and launders into the sump-tank E. From the latter the solution is pumped into the storage-tank B. The two valves $h$ are next closed and weak solution from tank C admitted to the material lying on the two treating-floors, followed by rerolling the pulp a short time, the result being to thoroughly wash out any solution remaining therein. After completing the rolling operation the valves $h'$ are opened, and the solution thus washed from the pulp flows from the end launders $d$ into the outer launder $d^2$ in open communication with the sump-tank D, and from the latter the weak solution is pumped into the elevated tank C. The residue or washed pulp is now removed from the treating-floors, thus practically completing the operation, the entire time consumed being, say, twenty-four hours for one charge. During this time the other pair of treating-floors $a\ a$ has been suitably charged with ore and solvent, the combination or pulp being kept continuously agitated by means of the corresponding rolling device, all substantially as hereinbefore described. After a sufficient quantity of the saturated or strong solution has been collected in the tank B it is drawn off and treated in the usual manner to separate the metals therefrom.

I claim as my invention and desire to secure by United States Letters Patent—

1. The process or method hereinbefore described of extracting precious metals from finely-divided materials or ores, which consists in spreading a comparatively thin layer of the material over a substantially flat and large working surface provided with drainage ducts or channels; then covering said material with suitable metal-dissolving or cyanid solution; then passing a heavy roll back and forth over the charge of material, &c., thereby at the same time thoroughly agitating or stirring the charge and forcing some of the solution into the drainage-ducts; then discharging said solution into the sump, and finally precipitating the precious metal from the solution.

2. The improvement in processes of extracting precious metals from finely-divided ores, which consists in spreading a comparatively thin layer of the suitably-prepared ores treated with metal-dissolving solution over a substantially flat and broad floor; then rolling a weight back and forth over the material lying upon said floor, thereby at the same time thoroughly agitating and aerating the material and forcing out some of the metal-carrying solution, and finally treating the latter to extract or precipitate the precious metal therefrom.

Signed at Providence, Rhode Island, this 8th day of February, 1902.

LEVI B. DARLING.

Witnesses:
GEO. H. REMINGTON,
HENRY P. STONE.